(12) United States Patent
Saeki

(10) Patent No.: US 11,654,724 B2
(45) Date of Patent: May 23, 2023

(54) TIRE

(71) Applicant: Sumitomo Rubber Industries, Ltd., Hyogo (JP)

(72) Inventor: Tetsuro Saeki, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 0 days.

(21) Appl. No.: 17/481,536

(22) Filed: Sep. 22, 2021

(65) Prior Publication Data

US 2022/0118799 A1     Apr. 21, 2022

(30) Foreign Application Priority Data

Oct. 20, 2020   (JP) .............................. JP2020-176230

(51) Int. Cl.
  *B60C 11/12*        (2006.01)
  *B60C 11/03*        (2006.01)

(52) U.S. Cl.
  CPC ........ *B60C 11/1204* (2013.01); *B60C 11/033* (2013.01); *B60C 11/1236* (2013.01); *B60C 11/1259* (2013.01); *B60C 2011/0365* (2013.01); *B60C 2011/1209* (2013.01); *B60C 2011/1213* (2013.01)

(58) Field of Classification Search
  CPC . B60C 11/0306; B60C 11/11; B60C 11/1204; B60C 11/033; B60C 11/1236; B60C 11/1259; B60C 2011/0365; B60C 2011/1209; B60C 2011/1213
  See application file for complete search history.

(56) References Cited

U.S. PATENT DOCUMENTS

| | | | |
|---|---|---|---|
| 2008/0185085 A1* | 8/2008 | Ohashi | B60C 11/1218 152/209.23 |
| 2009/0229721 A1* | 9/2009 | Ikeda | B60C 11/033 152/209.18 |
| 2010/0252159 A1* | 10/2010 | Mukai | B60C 11/0302 152/209.25 |
| 2012/0160385 A1* | 6/2012 | Tanaka | B60C 11/0306 152/209.22 |
| 2016/0303919 A1 | 10/2016 | Yamaoka | |
| 2017/0210176 A1 | 7/2017 | Ninomiya et al. | |
| 2017/0253090 A1 | 9/2017 | Wakizono et al. | |
| 2018/0079260 A1 | 3/2018 | Suzuki | |
| 2018/0178589 A1 | 6/2018 | Horiguchi et al. | |
| 2018/0297416 A1 | 10/2018 | Ninomiya | |

(Continued)

FOREIGN PATENT DOCUMENTS

JP     2018-177095 A     11/2018

OTHER PUBLICATIONS

The extended European search report issued by the European Patent Office dated Feb. 23, 2022, which corresponds to European Patent Application No. 21197024.9-1012 and is related to U.S. Appl. No. 17/481,536.

*Primary Examiner* — Robert C Dye
*Assistant Examiner* — Brendon Charles Darby
(74) *Attorney, Agent, or Firm* — Studebaker & Brackett PC (57) ABSTRACT

A tire includes a pair of shoulder land regions each provided with a plurality of wavy sipes and first shoulder lateral grooves each having a groove width of 2 mm or less and larger than a width of each of the wavy sipes. The tire further includes a pair of middle land regions and a crown land region each provided with a plurality of non-wavy sipes.

19 Claims, 3 Drawing Sheets

(56) References Cited

U.S. PATENT DOCUMENTS

| | | |
|---|---|---|
| 2018/0326792 A1 | 11/2018 | Takano |
| 2018/0339555 A1 | 11/2018 | Mizushima |
| 2019/0308462 A1 | 10/2019 | Yamaoka |
| 2019/0308466 A1 | 10/2019 | Kanematsu |

* cited by examiner

TIRE

TECHNICAL FIELD

The present disclosure relates to a tire.

BACKGROUND ART

Patent Document 1 listed below has proposed a tire provided with a first land region and a third land region. The first land region has a first lug groove extending from a first edge to a second edge, a second lug groove extending from the second edge to the first edge, and a first longitudinal narrow groove connecting the first lug groove and the second lug groove. The third land region has a third lateral groove that crosses the third land region and a lateral sipe that extends in a zigzag manner. It is believed that such tires can provide excellent on-ice/on-snow performance while maintaining steering stability on dry road surfaces.

PRIOR ART DOCUMENT

Patent Document

[Patent Document 1]
Japanese Unexamined Patent Application Publication No. 2018-177095

SUMMARY OF THE INVENTION

Problems to be Solved by the Invention

In recent years, with respect to tires for vehicles, there has been a demand for improvement in grip performance on wet roads and snowy roads (hereinafter, referred to simply as "wet roads and the like") while maintaining steering stability performance on dry road surfaces (hereinafter referred to simply as "steering stability performance") and uneven wear resistance performance.

The present disclosure was made in view of the above, and a primary object thereof is to provide a tire having improved grip performance on wet roads and the like while maintaining the steering stability performance and the uneven wear resistance performance.

Means for Solving the Problems

The present disclosure is a tire including a tread portion, wherein CL1

Effects of the Invention

By adopting the above configuration, the tire of the present disclosure can improve the grip performance on wet roads and the like, while maintaining the steering stability performance and the uneven wear resistance performance.

MODE FOR CARRYING OUT THE DISCLOSURE

An embodiment of the present disclosure will now be described in conjunction with accompanying drawings.

Figure 1:
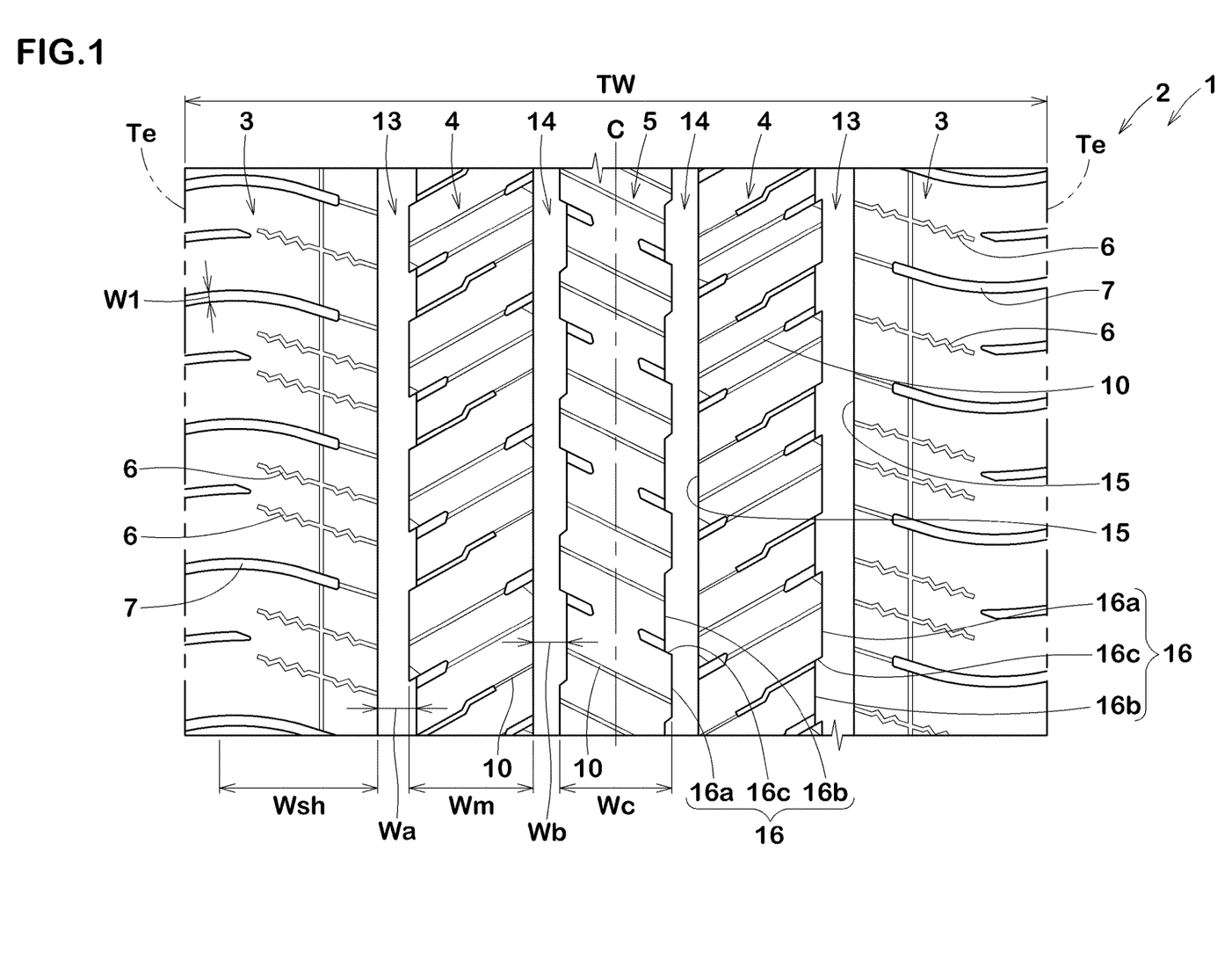
FIG. 1 a development view of a tread portion of a tire according to an embodiment of the present disclosure.

FIG. 1 is a development view of a tread portion 2 of a tire 1 showing an embodiment of the present disclosure. FIG. 1 shows an all-season pneumatic tire for passenger cars, for example. However, the present disclosure may be applied to pneumatic tires for heavy-duty and for light-trucks and the like, as well as to non-pneumatic tires that are not filled with pressurized air.

The tread portion 2 of the present embodiment has a pair of shoulder land regions 3, a pair of middle land regions 4, each middle land region being adjacent to a respective one of the pair of the shoulder land regions 3 on an inner side in a tire axial direction, and a crown land region 5 demarcated between the pair of the middle land regions 4.

Each of the shoulder land regions 3 is provided with a plurality of wavy sipes 6 and a plurality of first shoulder lateral grooves 7 each having a groove width larger than that of each of the wavy sipes 6 and of 2 mm or less. The wavy sipes 6 soak up a water film on the road surface, therefore, the grip performance on wet roads and the like is improved. In particular, since the wavy sipes 6 have a higher water absorption per unit axial length than non-wavy sipes 10 described below, the grip performance on the wet roads and the like is specifically improved. Since each of the first shoulder lateral grooves 7 has a groove width W1 larger than that of each of the wavy sipes, the first shoulder lateral grooves have an excellent drainage function. Further, since each of the first shoulder lateral grooves 7 is set to have a groove width W1 of 2 mm or less, excessive decrease in pattern rigidity of the shoulder land regions 3 is suppressed, therefore, the uneven wear resistance performance and the steering stability performance are maintained.

The pair of the middle land regions 4 and the crown land region 5 are each provided with a plurality of the non-wavy sipes 10. The middle land regions 4 and the crown land region 5 tend to have higher ground contact pressure than the shoulder land regions 3 during straightaway driving. Thereby, the non-wavy sipes ensure the pattern rigidity in the middle land regions 4 and the crown land region 5, therefore, the steering stability performance and the uneven wear resistance performance are maintained high. A plurality of the non-wavy sipes 10 is arranged in a tire circumferential direction in each of the middle land regions 4 and the crown land region 5.

In the present specification, the term sipe means an incision body having a width of 1.5 mm or less, which is clearly distinguished from a groove body having a groove width of more than 1.5 mm. Further, a wavy sipe means one having two or more unit waves, and is clearly distinguished from a non-wavy sipe having one or less unit waves. Furthermore, the non-wavy sipe includes a sipe extending linearly without having unit waves. Furthermore, the number of unit waves is the number of one-wavelength portions formed in one sipe. The wave shape includes an arc extending smoothly and a V-shape extending at acute angles.

The tread portion 2 includes a pair of shoulder main grooves 13 demarcating the shoulder land regions 3 and the middle land regions 4, and a pair of crown main grooves 14 demarcating the middle land regions 4 and the crown land region 5. In the present embodiment, each of the shoulder main grooves 13 and the crown main grooves 14 extends continuously in the tire circumferential direction. The shoulder main grooves 13 and the crown main grooves 14 are provided on both sides of a tire equator (C), one by one for each, for example. The tread portion 2 of the present embodiment is formed as a point symmetric pattern with respective to an arbitrary point on the tire equator (C). It should be noted that the tread portion 2 is not limited to a point-symmetrical pattern.

Each of the shoulder main grooves 13 and the crown main grooves 14 includes an outer groove edge 15 located on an axially outer side and an inner groove edge 16 located axially inside the outer groove edge 15. The outer groove edge 15 extends linearly along the tire circumferential direction, for example. The inner groove edge 16 extends in a crank shape along the tire circumferential direction, for example. Each of the inner groove edges 16 includes first portions (16a) extending linearly in the tire circumferential direction, second portions (16b) extending linearly in the tire circumferential direction on a tire-equator-(C) side of the first portions (16a), and third portions (16c) each extending linearly so as to connect one of the first portions (16a) and one of the second portions (16b) circumferentially adjacent thereto. The first portions (16a) and the second portions (16b) extend along the tire circumferential direction, for example. The third portions (16c) are connected to lateral grooves and sipes described below, for example.

In the present embodiment, each of the shoulder main grooves 13 is formed to have a groove width (Wa) larger than a groove width (Wb) of each of the crown main grooves 14. The groove width (Wa) of each of the shoulder main grooves 13 is 3.5% or more and 5.5% or less of a tread width TW, for example. The groove width (Wb) of each of the crown main grooves 14 is 3.0% or more and 5.0% or less of the tread width TW, for example.

The shoulder land regions 3 include tread edges (Te), which are outer edges in the tire axial direction. The tread edges (Te) are axially outermost ground contacting positions of a ground contacting surface of the tire 1 when the tire 1 in a standard state is in contact with a flat surface with zero camber angle by being loaded with a standard tire load. In this specification, dimensions and the like of various parts of the tire 1 are the values measured in this standard state, unless otherwise noted. A distance in the tire axial direction between the tread edges (Te) on both sides is the tread width TW.

The term "standard state" means a state in which the tire 1 is mounted on a standard rim (not shown), inflated to a standard inner pressure, and loaded with no tire load.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard inner pressure" is an air pressure specified for the concerned tire by a standard included in a standardization system on which the tire is based, for example, the maximum air pressure in JATMA, maximum value listed in the "TIRE LOAD LIMITS AT VARIOUS COLD INFLATION PRESSURES" table in TRA, and "INFLATION PRESSURE" in ETRTO.

The "standard tire load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

Figure 2:
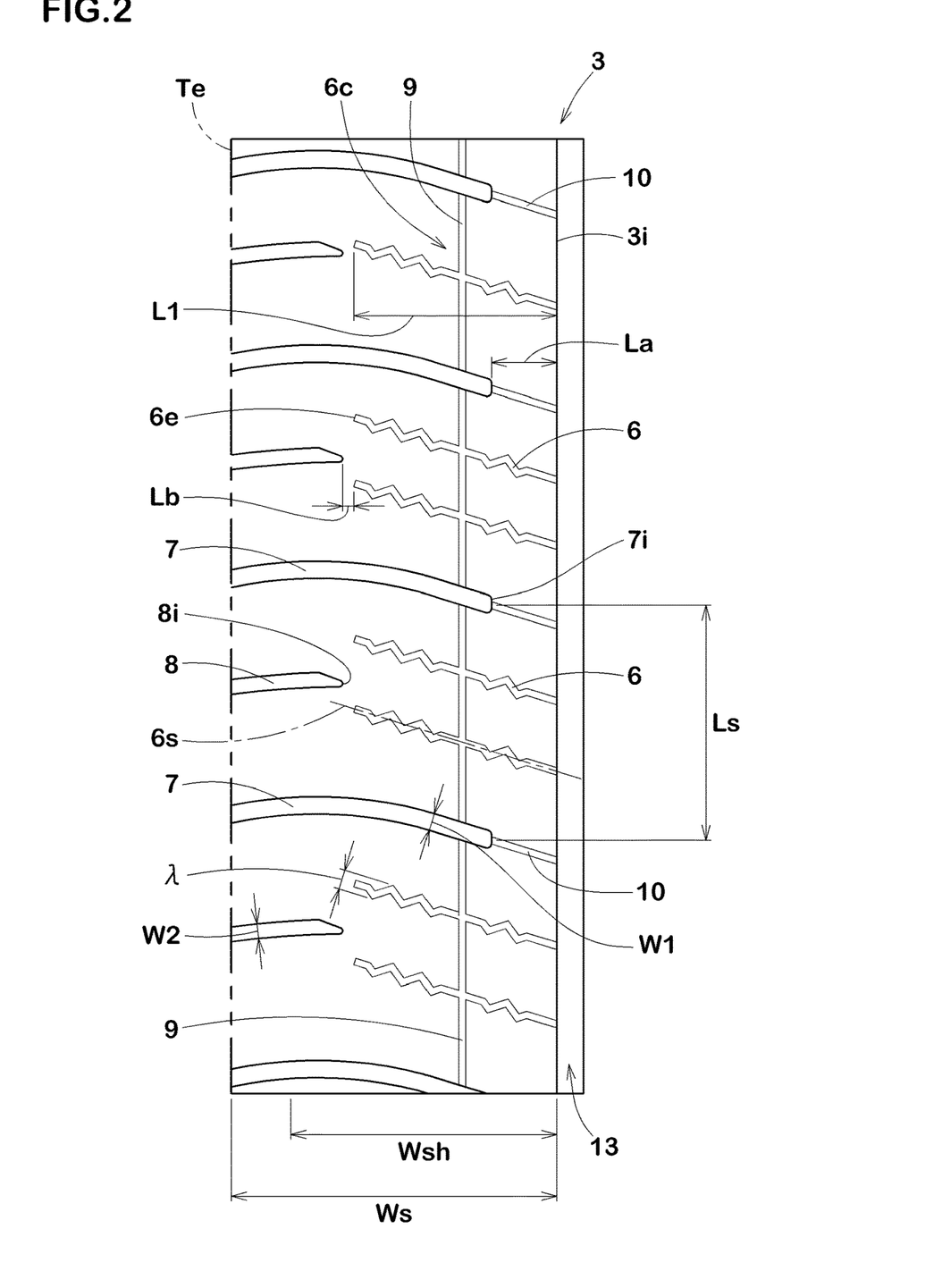
FIG. 2 an enlarged view of one of shoulder land regions of FIG. 1.

FIG. 2 is an enlarged view of one of the shoulder land regions 3 of FIG. 1. As shown in FIG. 2, each of the shoulder land regions 3 of the present embodiment is further provided with second shoulder lateral grooves 8, circumferential sipes 9 and the non-wavy sipes 10. The second shoulder lateral grooves 8, the circumferential sipes 9, and the non-wavy sipes 10 are each arranged in the tire circumferential direction in each of the shoulder land regions 3, for example.

Each of the wavy sipes 6 has an axially outer end (6e) positioned axially inside a respective one of the tread edges (Te). Therefore, excessive decrease in the rigidity of the shoulder land regions 3 is suppressed.

Each of the wavy sipes extends axially outward from an axially inner edge (3i) of a respective one of the shoulder land regions 3. The wavy sipes 6 configured as such can discharge water film absorbed inside the wavy sipes to the shoulder main grooves 13. In addition, the wavy sipes 6 can deform greatly when contacting the ground, therefore, the wavy sipes can absorb more water film therein.

Each of the wavy sipes 6 preferably includes two or more unit waves, and more preferably three or more unit waves, for example. Therefore, the effects described above are exerted effectively. In order to maintain high steering stability performance, each of the wavy sipes 6 preferably includes 8 or less unit waves, and more preferably 6 or less unit waves.

Each of the wavy sipes 6 has an amplitude λ of 2.0 mm or more and 3.0 mm or less in the present embodiment. The wavy sipes 6 configured as such can increase the water absorption effect while suppressing excessive decrease in the rigidity of the shoulder land regions 3. In the present specification, the amplitude λ is a distance between two most separated points of the wavy sipe 6 on both sides in a direction orthogonal to an amplitude center line (6s) of the wavy sipe 6.

Within the range of 89% of the tread width centered on the tire equator (C), it is preferred that each of the wavy sipes 6 has a length LT (not shown) measured as if the wavy sipe is a straight line of 103% or less of an axial width (Wsh) of each of the shoulder land regions 3. Thereby, the uneven wear resistance performance and the steering stability performance are maintained high. The length of each of the wavy sipes 6 as a single straight line is preferably 85% or more, more preferably 90% or more, and further preferably 98% or less of the width (Wsh) of each of the shoulder land regions 3.

The axially outer ends (6e) of the wavy sipes 6 are located in the range of 40% or more and 45% or less of the tread width TW from the tire equator (C). Since the outer ends (6e) of the wavy sipes 6 are located within 40% or more of the tread width TW from the tire equator (C), the grip performance can be effectively improved on wet roads. Since the outer ends (6e) of the wavy sipes 6 are located within 45% or less of the tread width TW from the tire equator (C), the uneven wear resistance performance and the steering stability performance can be maintained high. An axial length L1 of each of the wavy sipes 6 is preferably 55% or more, more preferably 60% or more, preferably 75% or less, and more preferably 70% or less of an axial width (Ws) of each of the shoulder land regions 3, for example.

Although not specifically limited, a depth (not shown) of each of the wavy sipes 6 is preferably 3 mm or more, more preferably 4 mm or more, preferably 7 mm or less, and more preferably 6 mm or less, for example.

At least one wavy sipe 6 is provided between the first shoulder lateral grooves 7 adjacent to each other in the tire circumferential direction. There may be one or two wavy sipes 6 between the first shoulder lateral grooves 7, for example. This is determined by a distance (Ls) in the tire circumferential direction between the first shoulder lateral grooves 7. In other words, when the distance (Ls) is large, two wavy sipes 6 are provided, and when the distance (Ls) is small, one heavy sipe 6 is provided. Thereby, the uneven wear resistance performance and the steering stability performance are maintained at high levels.

The amplitude center lines (6s) of the wavy sipes 6 are located at positions of substantially equal divisions of the distance (Ls) between the first shoulder lateral grooves 7 adjacent to each other in the tire circumferential direction. Therefore, above all, the uneven wear resistance performance is maintained high. The positions of substantially equal divisions can include not only positions of equal divisions of the distance (Ls), but also positions displaced in the tire circumferential direction from the equal division positions within 15% of the distance (Ls).

Each of the first shoulder lateral grooves is formed as an arc convex toward one side (upper side in FIG. 2) in the tire circumferential direction, for example. In the present embodiment, each of the first shoulder lateral grooves 7 extends from an axially inner end (7i) thereof located within a respective one of the shoulder land regions 3 axially outward beyond the tread edges (Te). The first shoulder lateral grooves 7 configured as such discharge water in the grooves to the outside of the tread edges (Te), therefore, the grip performance is improved.

A distance (La) in the tire axial direction between the inner end (7i) of each of the first shoulder lateral grooves 7 and the inner edge (3i) of a respective one of the shoulder land regions 3 is preferably 10% or more, more preferably 15% or more, preferably 30% or less, and more preferably 25% or less of the width (Ws) of each of the shoulder land regions 3. Since the distance (La) is 10% or more of the width (Ws), excessive decrease in the rigidity of the shoulder land regions 3 is suppressed. Since the distance (La) is 30% or less of the width (Ws), water films existing between the road surface and the ground contacting surface can be discharged effectively.

Each of the second shoulder lateral grooves 8 extends from an axially inner end (8i) thereof arranged within a respective one of the shoulder land regions 3 axially outward beyond a respective one of the tread edges (Te). The second shoulder lateral grooves 8 configured as such also improve the grip performance.

The inner ends (8i) of the second shoulder lateral grooves (8) are arranged axially outside the outer ends (6e) of the wavy sipes 6. Thereby, since the second shoulder lateral grooves 8 and the wavy sipes 6 do not overlap in the tire axial direction, decrease of the rigidity in the tire circumferential direction of the shoulder land regions 3 is further suppressed. A distance (Lb) in the tire axial direction between the inner end (8i) of each of the second shoulder lateral grooves 8 and the outer end (6e) of a respective one of the wavy sipes 6 is preferably 5% or less, and more preferably 3% or less of the width (Ws) of each of the shoulder land regions 3. It suffices as long as the distance (Lb) is 1% or more of the width (Ws) of each of the shoulder land regions 3.

The groove width W2 of each of the second shoulder lateral grooves 8 is preferably 90% or more, more preferably 95% or more, preferably 110% or less, and more preferably 105% or less of the groove width W1 of each of the first shoulder lateral grooves 7. Thereby, the effects described above are exerted effectively.

The circumferential sipes 9 extend linearly along the tire circumferential direction, for example. The circumferential sipes 9 configured as such maintain the uneven wear resistance performance high. It should be noted that each of the circumferential sipes 9 may extend in a wavy manner.

Each of the circumferential sipes 9 connects the first shoulder lateral grooves 7 adjacent thereto on both sides in the tire circumferential direction. The circumferential sipes 9 configured as such deform greatly when contacting the ground, and can absorb a lot of water from the road surface.

The circumferential sipes 9 intersect with the wavy sipes 6. Thereby, the effects described above are exerted effectively. The circumferential sipes 9 intersect the wavy sipes 6 at axially center portions (6c) of the wavy sipes. The circumferential sipes configured as such also promote the deformation of the wavy sipes 6 and further improve the grip performance on wet roads and the like. The center portion (6c) of each of the wavy sipes 6 is defined in the present specification as the area within 10% of the length L1 of each of the wavy sipes 6 from the axially middle position thereof to both sides in the tire axial direction.

Each of the non-wavy sipes 10 of the shoulder land regions 3 extends linearly. Each of the non-wavy sipes 10 extends axially outward from the inner edge (3i) of a respective one of the shoulder land regions 3 to be connected with the inner end (7i) of a respective one of the first shoulder lateral grooves 7. The non-wavy sipes 10 configured as such increase the deformation of the first shoulder lateral grooves 7 when contacting the ground, and further improve the grip performance.

Figure 3:
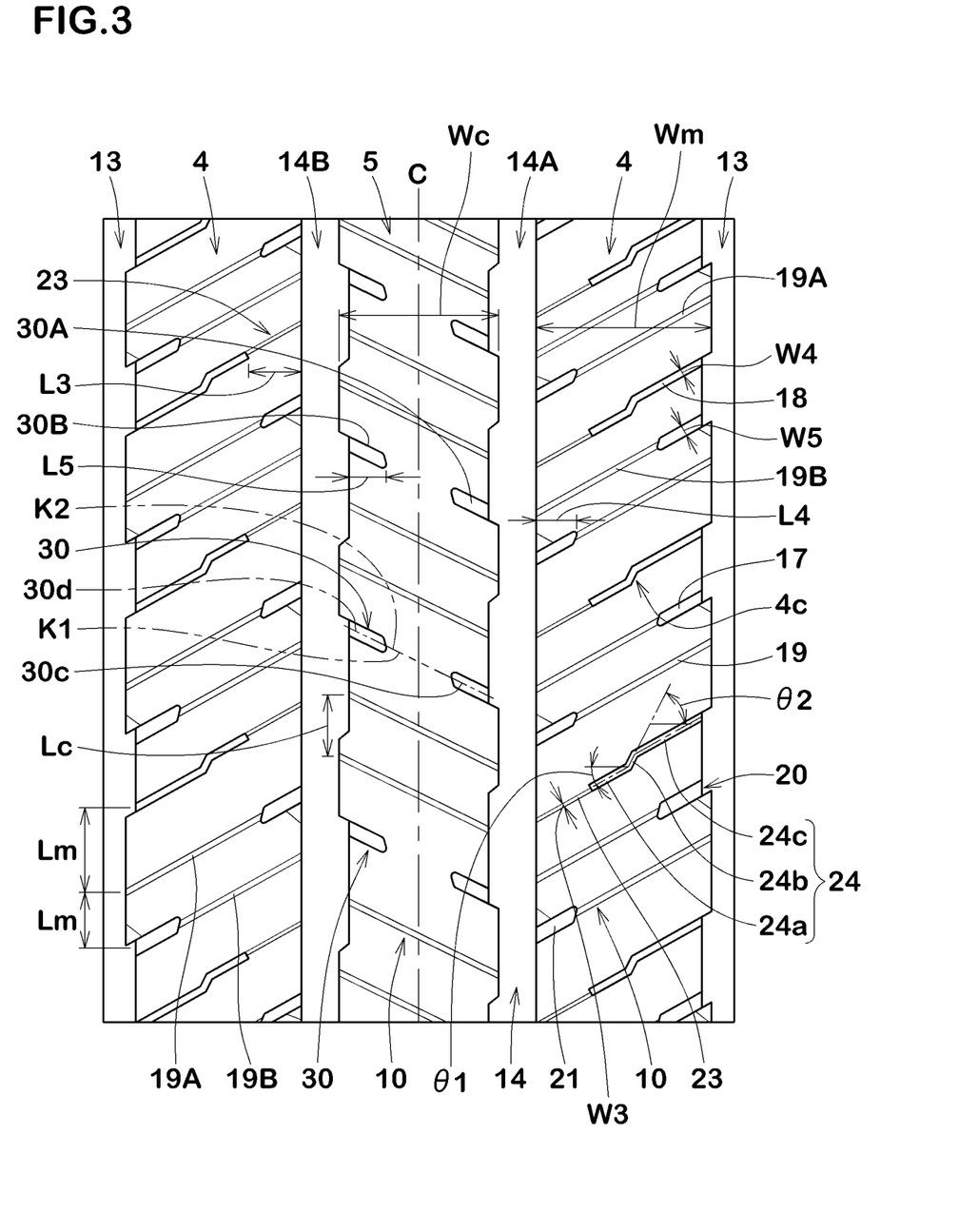
FIG. 3 an enlarged view of middle land regions and a crown land region of FIG. 1.

FIG. 3 is an enlarged view of the middle land regions 4 and the crown land region 5 of FIG. 1. As shown in FIG. 3, each of the middle land regions 4 includes the non-wavy sipes and middle lateral grooves 17 extending in the tire axial direction. The non-wavy sipes 10 include middle crossing sipes 18 each crossing a respective one of the middle land regions 4 and middle terminating sipes 19 each having an end terminating within a respective one of the middle land regions 4.

Each of the middle crossing sipes 18 includes a small width portion 23 having a small width W3 and a large width portion 24 having a width W4 larger than the small width portion 23, for example. Each of the small width portions 23 extends axially outward from a respective one of the crown main grooves 14, for example. The small width portions 23 in the present embodiment are inclined to one side in the tire axial direction. Each of the large width portions 24 extends from a respective one of the small width portions 23 to a respective one of the shoulder main grooves 13, for example. Each of the large width portions 24 includes a first large width portion (24a) connected with the small width portion 23 thereof and inclined at an angle same as the small width portion 23, a second large width portion (24b) inclined at an angle larger than the first large width portion (24a) with respect to the tire axial direction, and a third large width portion (24c) inclined at an angle smaller than the second large width portion (24b). Each of the small width portion (23), the first large width portion (24a), the second large width portion (24b), and the third large width portion (24c) extends linearly, for example. The small width portion (23), the first large width portion (24a), the second large width portion (24b), and the third large width portion (24c) are inclined to the same side with respective to the tire axial direction in the present embodiment.

An axial length L3 of each of the small width portions 23 is preferably 20% or more, more preferably 25% or more, and preferably 40% or less, more preferably 35% or less of an axial width (Wm) of each of the middle land regions 4.

Each of the second large width portions (24b) is located in an axially middle portion (4c) of a respective one of the middle land regions 4. In each of the middle land regions 4, the middle portion (4c) means the area from the middle in the tire axial direction of the middle land region 4 to both sides in the tire axial direction within 10% of the width (Wm) of the middle land region 4. The second large width portions (24b) configured as such decrease the rigidity of the middle portion (4c), which has relatively large rigidity in the middle land region 4, and equalizes the rigidity of the middle land region 4 over the tire axial direction, therefore, occurrence of uneven wear is suppressed.

The width W4 of each of the large width portions 24 is less than 1.5 mm. The width W4 of each of the large width portions 24 is preferably 1.2 times or more, more preferably 1.5 times or more, and preferably 2.5 times or less, more preferably 2.2 times or less the width W3 of each of the small width portions 23.

The first large width portions (24a) in the present embodiment are inclined at the same angle as the third large width portions (24c). It should be noted that the first large width portions (24a) are not limited to such an embodiment. Further, an angle θ2 of each of the second large width portions (24b) is larger than an angle θ1 of each of the first large width portions (24a) preferably by 10 degrees or more, more preferably by 20 degrees or more, and preferably by 50 degrees or less, more preferably by 40 degrees or less.

Each of the middle terminating sipes 19 extends linearly, for example. The middle terminating sipes 19 in the present embodiment are inclined to one side with respect to the tire axial direction. The middle terminating sipes 19 in the present embodiment are inclined to the same side as the small width portion 23. The middle terminating sipes 19 extend parallel (at the same angle) to the small width portions 23 in this embodiment.

The middle terminating sipes 19 in the present embodiment include first terminating sipes 19A extending from one of the shoulder main grooves 13 and second terminating sipes 19B extending from one of the crown main grooves 14.

Each of the middle lateral grooves 17 extends linearly, for example. The middle lateral grooves 17 in the present embodiment terminate without reaching the middle portion (4c) in each of the middle land regions 4. The middle lateral grooves 17 configured as such suppress decrease in the rigidity of the middle land regions 4.

The middle lateral grooves 17 include outer middle lateral grooves 20 extending axially inward from one of the shoulder main grooves 13 to terminate within one of the middle land regions 4, and inner middle lateral grooves 21 extending axially outward from one of the crown main grooves 14 to terminate within one of the middle land regions 4. Each of the outer middle lateral grooves 20 is connected with a respective one of the second terminating sipes 19B. Each of the inner middle lateral grooves 21 is connected with a respective one of the first terminating sipes 19A. Such an embodiment improves the grip performance on the wet roads and the like.

It is preferred that each of distances (Lm) in the tire circumferential direction between the non-wavy sipes 10 adjacent to each other in the tire circumferential direction in the middle land regions 4 is smaller than the distance (Ls) (shown in FIG. 2) in the tire circumferential direction between the first shoulder lateral grooves 7. Thereby, a large number of the non-wavy sipes 10 are formed in the middle land regions 4, therefore, the drainage function of the middle land regions 4, which are located axially inner sides and are not easily drained, is improved.

It is preferred that an axial length L4 of each of the middle lateral grooves 17 is smaller than the length L3 of each of the small width portions 23. The length L4 of each of the middle lateral grooves 17 is preferably 15% or more, more preferably 20% or more, and preferably 35% or less, more preferably 30% or less of the width (Wm) of each of the middle land regions 4.

It is preferred that a groove width W5 of each of the middle lateral grooves 17 is smaller than the groove width W1 of each of the first shoulder lateral grooves 7. Therefore, the rigidity of the middle land regions 4, which receive relatively high ground contact pressure, is maintained. The groove width W5 of each of the middle lateral grooves 17 is preferably 60% or more, more preferably 65% or more, and preferably 80% or less, more preferably 75% or less of the groove width W1 of each of the first shoulder lateral grooves 7.

The crown land region 5 is provided with the non-wavy sipes 10 and a plurality of crown lateral grooves 30.

Each of the non-wavy sipes 10 of the crown land region 5 crosses the crown land region 5, for example. Each of the non-wavy sipes 10 of the crown land region 5 extends linearly. Multiple, two in the present embodiment, non-wavy sipes 10 are provided between the crown lateral grooves adjacent to each other in the tire circumferential direction.

It is preferred that a distance (Lc) in the tire circumferential direction between the non-wavy sipes 10 adjacent to each other in the tire circumferential direction in the crown land region 5 is smaller than the distance (Ls) in the tire circumferential direction between the first shoulder lateral grooves 7. Thereby, a large number of the non-wavy sipes 10 are arranged in the crown land region 5, therefore, the drainage function of the crown land region 5, which is located on an axially inner side and is not easily drained, is improved. In the present embodiment, the distance (Lc) is smaller than the distance (Ls) even when the crown lateral groove(s) is/are arranged between the non-wavy sipes 10 adjacent to each other in the tire circumferential direction.

Each of the crown lateral grooves 30 extends linearly. Each of the crown lateral grooves 30 has one end connected with one of the crown main grooves 14 and the other end arranged within the crown land region 5. Each of the crown lateral grooves 30 terminates without reaching the tire equator (C). A length L5 in the tire axial direction of each of the crown lateral grooves 30 is preferably 15% or more, more preferably 20% or more, and preferably 35% or less, more preferably 30% or less of a width (Wc) of the crown land region 5.

The crown lateral grooves 30 include first crown lateral grooves 30A connected to the crown main groove 14A on one side (right side in FIG. 3) and second crown lateral grooves 30B connected to the crown main groove 14B on the other side (left side in FIG. 3). Each of the first crown lateral grooves 30A intersects with a second virtual line K2, which is a smooth extension of a groove width centerline (30d) of a respective one of the second crown lateral grooves 30B. The second virtual line K2 traverses the first crown lateral groove 30A in the longitudinal direction. Each of the second crown lateral grooves 30B intersects with a first virtual line K1, which is a smooth extension of a groove width centerline (30c) of a respective one of the first crown lateral grooves 30A. The first virtual line K1 traverses the second crown lateral groove 30B in the longitudinal direction.

In the area within 89% of the tread width TW centered on the tire equator (C), a ratio (Wsh/Wc) of the width (Wc) in the tire axial direction of the crown land region 5 and the width (Wsh) in the tire axial direction of each of the pair of the shoulder land regions 3 is preferably 1.3 or more and 1.6 or less. The area within 89% of the tread width TW centered on the tire equator (C) is a region where relatively large ground contact pressure is applied to during straightaway driving. By specifying the ratio of the widths of the land regions in this area, the grip performance on wet roads and the like can be effectively improved. Since the ratio (Wsh/Wc) is 1.3 or more, lateral rigidity of the shoulder land regions 3 is increased, therefore, the uneven wear resistance performance and the steering stability performance are maintained. Since the ratio (Wsh/Wc) is 1.6 or less, the lateral rigidity of the crown land region 5 is maintained high, therefore, the grip performance on wet roads is improved. From such a point of view, it is preferred that the ratio (Wsh/Wc) is 1.4 or more and 1.5 or less.

In the area within 89% of the tread width TW centered on the tire equator (C), it is preferred that a land ratio LS of each of the shoulder land regions 3 is smaller than a land ratio LC of the crown land region 5. The ground contact pressure in the shoulder land regions 3 tends to be lower than that in the crown land region 5 during straightaway driving. Therefore, by setting the land ratio LS of the shoulder land regions 3 to be smaller than the land ratio LC of the crown land region 5, it is possible that the uneven wear resistance performance is maintained high. In the present specification, the land ratio is defined as a ratio (S/Sa) of a surface area (S) of the ground contacting surface in each of the land regions and a surface area (Sa) of a virtual ground contacting surface obtained by filling all the grooves and the sipes of each of the land regions.

If the land ratio LS of each of the shoulder land regions 3 is excessively smaller than the land ratio LC of the crown land region 5, the lateral rigidity of the shoulder land regions 3 becomes small, therefore, it is possible that the steering stability is deteriorated. For this reason, it is preferred that the land ratio LS of each of the shoulder land regions 3 is 95% or more of the land ratio LC of the crown land region 5. Although not particularly limited, the land ratio LC of the crown land region 5 is preferably 89% or higher, more preferably 91% or higher, and further preferably 93% or higher. A land ratio LM of each of the middle land regions 4 is preferably 87% or higher, more preferably 89% or higher, and further preferably 91% or higher. The land ratio LS of each of the shoulder land regions 3 is preferably 87% or higher, more preferably 89% or higher, further preferably 91% or higher.

While detailed description has been made of the especially preferred embodiment of the present disclosure, the present disclosure can be embodied in various forms without being limited to the illustrated embodiment.

Examples

Tires of size 255/50R20 having the basic pattern shown in FIG. 1 were made by way of test according to the specifications listed in Table 1. Then, each of the test tires was tested for the grip performance on the wet roads and the like, the steering stability performance, and the uneven wear resistance performance. It should be noted that the common specifications of the test tires and the test methods were as follows.

Tire rim: 20×7.5J
Tire inner pressure: 230 kPa (all wheels)

<Grip Performance on Wet Roads and the Like and Steering Stability Performance>

Each of the test tires was mounted on all wheels of a passenger SUV with a displacement of 4000 cc. Then, a test driver evaluated stability and handleability at the time of traction and braking by the driver's feeling while driving the test vehicle on a road surface with puddles of snow beginning to melt, an asphalt road surface with puddles of water having a depth of 3 mm or less, and a dry asphalt road surface of a test course. The results are indicated by an evaluation point based on Example 1 being 100. The higher the numerical value, the better the grip performance on wet roads and the like and the steering stability performance are.

<Uneven Wear Resistance Performance>

The test driver evaluated the occurrence of the uneven wear in the tread portion 2 after driving on the dry asphalt road surface described above. The results are indicated by an evaluation point based on the value of Example 1 being 100. The larger the numerical value, the better the uneven wear resistance performance is.

TABLE 1

|  | Ref. 1 | Ref. 2 | Ref. 3 | Ref. 4 | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- | --- | --- | --- | --- |
| Sipe of Shoulder land region | non-wavy | wavy | wavy | wavy | wavy | wavy | wavy | wavy | wavy | wavy | wavy | wavy |
| Sipe of Middle land region | non-wavy | wavy | wavy | non-wavy | non-wavy | non-wavy | non-wavy | non-wavy | non-wavy | non-wavy | non-wavy | non-wavy |
| Sipe of Crown land region | non-wavy | non-wavy | wavy | non-wavy | non-wavy | non-wavy | non-wavy | non-wavy | non-wavy | non-wavy | non-wavy | non-wavy |
| Ratio of Width (Wsh)/Width (Wc) | 1.5 | 1.5 | 1.5 | 1.5 | 1.5 | 1.0 | 1.8 | 1.5 | 1.5 | 1.5 | 1.5 | 1.5 |
| Groove width W1 [mm] | 2.0 | 2.0 | 2.0 | 3.0 | 2.0 | 2.0 | 2.0 | 2.0 | 2.0 | 2.0 | 2.0 | 2.0 |
| Land ratio LS [%] | 89 | 89 | 89 | 89 | 89 | 89 | 89 | 91 | 89 | 89 | 89 | 89 |
| Land ratio LM [%] | 89 | 89 | 89 | 89 | 89 | 89 | 89 | 89 | 89 | 89 | 89 | 89 |
| Land ratio LC [%] | 91 | 91 | 91 | 91 | 91 | 91 | 91 | 89 | 91 | 91 | 91 | 91 |
| Ratio of Length LT/Width (Wsh) [%] | 103 | 103 | 103 | 103 | 103 | 103 | 103 | 103 | 110 | 103 | 103 | 103 |
| Number of Unit waves of Wavy sipe | 3 | 3 | 3 | 3 | 3 | 3 | 3 | 3 | 3 | 5 | 3 | 3 |
| Amplitude λ [mm] | 2.5 | 2.5 | 2.5 | 2.5 | 2.5 | 2.5 | 2.5 | 2.5 | 2.5 | 2.5 | 1.0 | 4.0 |
| Grip performance [Evaluation point: larger is better] | 85 | 100 | 105 | 100 | 100 | 95 | 105 | 95 | 105 | 105 | 95 | 105 |
| Steering stability performance [Evaluation point: larger is better] | 100 | 90 | 90 | 90 | 100 | 100 | 97 | 100 | 97 | 97 | 100 | 97 |

TABLE 1-continued

| | Ref. 1 | Ref. 2 | Ref. 3 | Ref. 4 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|---|---|
| Uneven wear resistance performance [Evaluation point: larger is better] | 100 | 97 | 90 | 97 | 100 | 100 | 97 | 100 | 97 | 97 | 100 | 97 |

As shown in the table, in the tires in the Examples, the grip performance on wet roads and the like was improved while the steering stability performance and the uneven wear resistance performance were maintained.

STATEMENT OF DISCLOSURE

The present disclosure includes the following aspects.

Present Disclosure 1

A tire including a tread portion, wherein
the tread portion has a pair of shoulder land regions, a pair of middle land regions, each middle land region being adjacent to a respective one of the shoulder land regions on an inner side in a tire axial direction, and a crown land region demarcated between the middle land regions,
each of the shoulder land regions is provided with a plurality of wavy sipes and a plurality of first shoulder lateral grooves each having a groove width of 2 mm or less and larger than a width of each of the wavy sipes, and
the pair of the middle land regions and the crown land region are provided with a plurality of non-wavy sipes.

Present Disclosure 2

The tire according to Present disclosure 1, wherein
the shoulder land regions include tread edges each being an axially outer edge of a respective one of the shoulder land regions, and
each of the wavy sipes has an axially outer end positioned axially inside a respective one of the tread edges.

Present Disclosure 3

The tire according to Present disclosure 2, wherein
each of the shoulder land regions is provided with a plurality of second shoulder lateral grooves, and each of the second shoulder lateral grooves has an axially inner end arranged axially outside the outer ends of the wavy sipes.

Present Disclosure 4

The tire according to Present disclosure 3, wherein
the first shoulder lateral grooves are arranged in a tire circumferential direction, and
at least one wavy sipe is provided between the first shoulder lateral grooves adjacent to each other in the tire circumferential direction.

Present Disclosure 5

The tire according to Present disclosure 3 or 4, wherein an amplitude center line of each of the wavy sipes is arranged at one of positions of substantially equal divisions of a distance in the tire circumferential direction between the first shoulder lateral grooves adjacent to each other in the tire circumferential direction.

Present Disclosure 6

The tire according to Present disclosure 5, wherein
the non-wavy sipes are arranged in the tire circumferential direction, and
a distance in the tire circumferential direction between the non-wavy sipes adjacent to each other in the tire circumferential direction is smaller than the distance between the first shoulder lateral grooves.

Present Disclosure 7

The tire according to any one of Present disclosures 1 to 6, wherein each of the wavy sipes extends axially outward from an axially inner edge of a respective one of the shoulder land regions.

Present Disclosure 8

The tire according to any one of Present disclosures 1 to 7, wherein axially outer ends of the wavy sipes are located in a range of 40% or more and 45% or less of a tread width from a tire equator.

Present Disclosure 9

The tire according to any one of Present disclosures 1 to 8, wherein each of the non-wavy sipes of the middle land regions crosses a respective one of the middle land regions.

Present Disclosure 10

The tire according to any one of Present disclosures 1 to 9, wherein each of the non-wavy sipes of the crown land region crosses the crown land region.

Present Disclosure 11

The tire according to any one of Present disclosures 1 to 10, wherein each of the wavy sipes includes two or more unit waves.

Present Disclosure 12

The tire according to any one of Present disclosures 1 to 11, wherein each of the wavy sipes has an amplitude of 2.0 mm or more and 3.0 mm or less.

Present Disclosure 13

The tire according to any one of Present disclosures 1 to 12, wherein in an area within 89% of a tread width centered on a tire equator, a ratio (Wsh/Wc) of a width (Wc) in the tire axial direction of the crown land region and a width (Wsh) in the tire axial direction of each of the shoulder land regions is 1.3 or more and 1.6 or less.

Present Disclosure 14

The tire according to Present disclosure 13, wherein each of the wavy sipes has a length measured as if the wavy sipe is a straight line of 103% or less of the width (Wsh).

Present Disclosure 15

The tire according to any one of Present disclosures 1 to 14, wherein in an area within 89% of a tread width centered on a tire equator, a land ratio (LS) of each of the shoulder land regions is smaller than a land ratio (LC) of the crown land region.

Present Disclosure 16

The tire according to Present disclosure 15, wherein the land ratio (LS) of each of the shoulder land regions is 95% or more of the land ratio (LC) of the crown land region.

DESCRIPTION OF REFERENCE SIGNS 1 tire
3 shoulder land region
4 middle land region
5 crown land region
6 wavy sipe
7 first shoulder lateral groove
10 non-wavy sipe

The invention claimed is:

1. A tire comprising a tread portion, wherein
the tread portion has a pair of shoulder land regions, a pair of middle land regions, each middle land region being adjacent to a respective one of the shoulder land regions on an inner side in a tire axial direction, and a crown land region demarcated between the middle land regions,
each of the shoulder land regions is provided with a plurality of wavy sipes and a plurality of first shoulder lateral grooves each having a groove width of 2 mm or less and larger than a width of each of the wavy sipes,
the pair of the middle land regions and the crown land region are provided with a plurality of non-wavy sipes,
the tread portion includes a pair of shoulder main grooves demarcating the shoulder land regions and the middle land regions, and a pair of crown main grooves demarcating the middle land regions and the crown land region,
each of the shoulder main grooves and the crown main grooves includes an axially outer groove edge and an axially inner groove edge located axially inside the outer groove edge,
the axially outer groove edge extends linearly along the tire circumferential direction, and
the axially inner groove edge includes first portions extending linearly along the tire circumferential direction, second portions extending linearly along the tire circumferential direction on the axially inner side of the first portions, and third portions each extending linearly so as to connect one of the first portions and one of the second portions circumferentially adjacent thereto so that the axially inner groove edge extends in a crank shape along the tire circumferential direction.

2. The tire according to claim 1, wherein
the shoulder land regions include tread edges each being an axially outer edge of a respective one of the shoulder land regions, and
each of the wavy sipes has an axially outer end positioned axially inside a respective one of the tread edges.

3. The tire according to claim 2, wherein
each of the shoulder land regions is provided with a plurality of second shoulder lateral grooves, and
each of the second shoulder lateral grooves has an axially inner end arranged axially outside the outer ends of the wavy sipes.

4. The tire according to claim 3, wherein
the first shoulder lateral grooves are arranged in a tire circumferential direction, and
at least one wavy sipe is provided between the first shoulder lateral grooves adjacent to each other in the tire circumferential direction.

5. The tire according to claim 3, wherein an amplitude center line of each of the wavy sipes is arranged at one of positions of substantially equal divisions of a distance in the tire circumferential direction between the first shoulder lateral grooves adjacent to each other in the tire circumferential direction.

6. The tire according to claim 5, wherein
the non-wavy sipes are arranged in the tire circumferential direction, and
a distance in the tire circumferential direction between the non-wavy sipes adjacent to each other in the tire circumferential direction is smaller than the distance between the first shoulder lateral grooves.

7. The tire according to claim 1, wherein each of the wavy sipes extends axially outward from an axially inner edge of a respective one of the shoulder land regions.

8. The tire according to claim 1, wherein axially outer ends of the wavy sipes are located in a range of 40% or more and 45% or less of a tread width from a tire equator.

9. The tire according to claim 1, wherein each of the non-wavy sipes of the middle land regions crosses a respective one of the middle land regions.

10. The tire according to claim 1, wherein each of the non-wavy sipes of the crown land region crosses the crown land region.

11. The tire according to claim 1, wherein each of the wavy sipes includes two or more unit waves.

12. The tire according to claim 1, wherein each of the wavy sipes has an amplitude of 2.0 mm or more and 3.0 mm or less.

13. The tire according to claim 1, wherein in an area within 89% of a tread width centered on a tire equator, a ratio (Wsh/Wc) of a width (Wc) in the tire axial direction of the crown land region and a width (Wsh) in the tire axial direction of each of the shoulder land regions is 1.3 or more and 1.6 or less.

14. The tire according to claim 13, wherein each of the wavy sipes has a length measured as if the wavy sipe is a straight line of 103% or less of the width (Wsh).

15. The tire according to claim 1, wherein in an area within 89% of a tread width centered on a tire equator, a land ratio (LS) of each of the shoulder land regions is smaller than a land ratio (LC) of the crown land region.

16. The tire according to claim 15, wherein the land ratio (LS) of each of the shoulder land regions is 95% or more of the land ratio (LC) of the crown land region.

17. The tire according to claim 1, wherein
each of the shoulder land regions is provided with a plurality of non-wavy sipes, and each of the non-wavy sipes of the shoulder land regions extends linearly and axially outward from an axially inner edge of a respective one of the shoulder land regions to be connected with an axially inner end of a respective one of the first shoulder lateral grooves.

18. The tire according to claim 1, wherein each of the shoulder land regions is further provided with second shoulder lateral grooves, circumferential sipes and the non-wavy sipes, the second shoulder lateral grooves, the circumferential sipes, and the non-wavy sipes are arranged in the tire circumferential direction in each of the shoulder land regions, and each of the circumferential sipes extends linearly along the tire circumferential direction so as to connect the first shoulder lateral grooves adjacent thereto on both sides in the tire circumferential direction.

19. The tire according to claim 1, wherein each of the wavy sipes has a depth of 3 mm or more and 7 mm or less.

* * * * *